US012046244B2

(12) United States Patent
Abu Asba et al.

(10) Patent No.: US 12,046,244 B2
(45) Date of Patent: *Jul. 23, 2024

(54) SYSTEMS AND METHOD FOR THIRD PARTY NATURAL LANGUAGE UNDERSTANDING SERVICE INTEGRATION

(71) Applicant: ServiceNow, Inc., Santa Clara, CA (US)

(72) Inventors: Nabil Abu Asba, The Hague (NL); Mark David Griffin, Lakeside, CA (US)

(73) Assignee: ServiceNow Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/815,809

(22) Filed: Jul. 28, 2022

(65) Prior Publication Data
US 2022/0366913 A1    Nov. 17, 2022

Related U.S. Application Data

(63) Continuation of application No. 16/821,670, filed on Mar. 17, 2020, now Pat. No. 11,423,910.

(60) Provisional application No. 62/820,730, filed on Mar. 19, 2019.

(51) Int. Cl.
G10L 21/00      (2013.01)
G06F 9/54       (2006.01)
G06F 16/9032    (2019.01)
G06F 40/30      (2020.01)
G10L 15/30      (2013.01)
G10L 25/00      (2013.01)

(52) U.S. Cl.
CPC .............. *G10L 15/30* (2013.01); *G06F 9/547* (2013.01); *G06F 16/90332* (2019.01); *G06F 40/30* (2020.01)

(58) Field of Classification Search
None
See application file for complete search history.

(56) References Cited

U.S. PATENT DOCUMENTS

| | | | |
|---|---|---|---|
| 6,609,122 B1 | 8/2003 | Ensor | |
| 7,020,706 B2 | 3/2006 | Cates | |
| 7,028,301 B2 | 4/2006 | Ding | |
| 7,062,683 B2 | 6/2006 | Warpenburg | |

(Continued)

OTHER PUBLICATIONS

U.S. Appl. No. 16/738,617, filed Jan. 9, 2020, Asbi et al.

*Primary Examiner* — Satwant K Singh
(74) *Attorney, Agent, or Firm* — Fletcher Yoder, PC

(57) ABSTRACT

A virtual agent that utilizes an in-house natural language understanding (NLU) service and integrates a third party NLU service. The third-party NLU service is integrated with the virtual agent via a transformation script that establishes a transformation boundary through which communications are directed for adjustment and conditioning. The third party NLU service communicates with the virtual agent via an application programming interface (API). The virtual agent receives an utterance from a user via a chat session and provides the utterance to the third party NLU service. The third party NLU service may return intents, entities, and confidence, generate and return a response, and/or take actions within the cloud-based platform via the API, dependent upon the degree of integration. The virtual agent then provides a response to the user via the chat session.

20 Claims, 10 Drawing Sheets

(56) References Cited

U.S. PATENT DOCUMENTS

| | | |
|---|---|---|
| 7,131,037 B1 | 10/2006 | LeFaive |
| 7,170,864 B2 | 1/2007 | Matharu |
| 7,350,209 B2 | 3/2008 | Shum |
| 7,610,512 B2 | 10/2009 | Gerber |
| 7,617,073 B2 | 11/2009 | Trinon |
| 7,689,628 B2 | 3/2010 | Garg |
| 7,783,744 B2 | 8/2010 | Garg |
| 7,890,802 B2 | 2/2011 | Gerber |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,224,683 B2 | 7/2012 | Manos |
| 8,266,096 B2 | 9/2012 | Navarrete |
| 8,457,928 B2 | 6/2013 | Dang |
| 8,478,569 B2 | 7/2013 | Scarpelli |
| 8,674,992 B2 | 3/2014 | Poston |
| 8,689,241 B2 | 4/2014 | Naik |
| 8,743,121 B2 | 6/2014 | De Peuter |
| 8,887,133 B2 | 11/2014 | Behnia |
| 9,065,783 B2 | 6/2015 | Ding |
| 9,122,552 B2 | 9/2015 | Whitney |
| 9,239,857 B2 | 1/2016 | Trinon |
| 9,535,737 B2 | 1/2017 | Joy |
| 9,557,969 B2 | 1/2017 | Sharma |
| 9,792,387 B2 | 10/2017 | George |
| 9,922,642 B2 | 3/2018 | Pitschel et al. |
| 10,699,704 B2 * | 6/2020 | Kim ................... G10L 15/30 |
| 11,295,735 B1 | 4/2022 | Anuar et al. |
| 11,423,910 B2 * | 8/2022 | Abu Asba ............ G06F 40/30 |
| 2018/0075395 A1 | 3/2018 | Mizumoto et al. |
| 2018/0189267 A1 | 7/2018 | Takiel |
| 2018/0309642 A1 | 10/2018 | Rutten et al. |
| 2019/0147853 A1 | 5/2019 | Gunasekara et al. |
| 2019/0243749 A1 | 8/2019 | Rutten et al. |
| 2019/0312789 A1 | 10/2019 | Asbi et al. |
| 2020/0228412 A1 | 7/2020 | Abu Asba et al. |
| 2020/0236006 A1 | 7/2020 | Asba et al. |
| 2020/0302020 A1 | 9/2020 | Abu Asba et al. |
| 2021/0019357 A1 * | 1/2021 | Bennett ................ G10L 15/26 |
| 2021/0117624 A1 * | 4/2021 | Aghajanyan ....... G06Q 30/0631 |
| 2023/0062201 A1 * | 3/2023 | Goel .................... G10L 15/18 |

* cited by examiner

SYSTEMS AND METHOD FOR THIRD PARTY NATURAL LANGUAGE UNDERSTANDING SERVICE INTEGRATION

CROSS-REFERENCE TO RELATED APPLICATION

This application is a continuation of U.S. patent application Ser. No. 16/821,670, filed Mar. 17, 2020, which claims priority from and the benefit of U.S. Provisional Application Ser. No. 62/820,730, filed Mar. 19, 2019, both entitled "SYSTEMS AND METHOD FOR THIRD PARTY NATURAL LANGUAGE UNDERSTANDING SERVICE INTEGRATION," and are hereby incorporated by reference in their entirety for all purposes.

BACKGROUND

The present disclosure relates generally to natural language understanding (NLU) services and, more specifically, to integrating third party NLU services into a chat service.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT), data, and services for their continued operation and success. A respective organization's IT infrastructure may have associated hardware resources (e.g., computing devices, load balancers, firewalls, switches) and/or software resources (e.g., productivity software, database applications, custom applications). Over time, more and more organizations have turned to cloud computing approaches to supplement or enhance their IT infrastructure solutions.

Cloud computing relates to sharing computing resources via the Internet. In particular, a cloud computing infrastructure enables users (e.g., individuals, enterprises) to access a shared pool of computing resources (e.g., servers, storage devices, networks, applications, other computing based services). By doing so, users are able to access computing resources on demand that may be located at remote locations. These resources may be used to perform a variety computing functions (e.g., storing and/or processing large quantities of computing data). For enterprise and other organization users, cloud computing provides flexibility in accessing resources, without accruing large up-front costs, such as purchasing expensive network equipment or investing large amounts of time in establishing a private network infrastructure. Instead, by utilizing cloud computing resources, users are able redirect their resources to focus on their enterprise's core functions.

In modern communication networks, examples of cloud computing services include infrastructure as a service (IaaS), software as a service (SaaS), and platform as a service (PaaS) technologies. IaaS is a model in which providers abstract away the complexity of hardware infrastructure and provide rapid, simplified provisioning of virtual servers and storage, giving enterprises access to computing capacity on demand. In such an approach, however, a user may be left to install and maintain platform components and applications. SaaS is a delivery model that provides software as a service rather than an end product. Instead of utilizing a local network or individual software installations, software may be licensed on a subscription basis, hosted on a remote machine, and accessed by client customers as needed. For example, users are generally able to access a variety of enterprise and/or IT-related software via a web browser. PaaS acts as an extension of SaaS that goes beyond providing software services by offering customizability and expandability features to meet a user's needs. For example, PaaS can provide a cloud-based developmental platform for users to develop, modify, and/or customize applications and/or automating enterprise operations, without maintaining network infrastructure and/or allocating computing resources normally associated with these functions.

Customers of certain IaaS, SaaS, and/or PaaS providers may offer an automated chat service, such as a chat bot or a virtual agent, to their end-users to facilitate efficient performance of their respective core functions. For example, the virtual agent that a customer offers to end-users may assist with password issues, updating profiles, placing orders, scheduling meetings, and so forth, thereby enabling personnel employed by the customer to focus on performing more high-value tasks. In some situations, the virtual agent is part of a Natural Language Processing (NLP) or NLU system. NLP is a general area of computer science and artificial intelligence (AI) that involves some form of processing of natural language input. Examples of areas addressed by NLP include language translation, speech generation, parse tree extraction, part-of-speech identification, and others. NLU is a sub-area of NLP that specifically focuses on understanding user utterances. Examples of areas addressed by NLU include question-answering (e.g., reading comprehension questions), article summarization, and others. For example, a NLU system may use algorithms to reduce human language (e.g., spoken or written) into a set of known symbols for consumption by a downstream virtual agent.

Certain third parties, which may be external to the customers and/or providers of IaaS, SaaS, and/or PaaS, may also offer NLU services that are capable of extracting meaning from user utterances. These third party NLU services may be particularly adept at performing certain aspects of NLU or may provide desirable features. As such, in some cases, a customer of a provider may prefer to use a third party NLU service (or aspects thereof) to complement, supplement, or replace the automated, native chat service offered by the provider. However, such an integration may be a tedious, time-consuming process that may limit customer satisfaction or performance of the third party NLU service. As such, there is a need to facilitate integration of native chat services of providers with third party NLU services to meet customer demand.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The disclosed subject matter includes various techniques for integrating a third party NLU service into a virtual agent, which utilizes an in-house NLU service associated with a cloud-based platform that supports the virtual agent. The third party NLU service may communicate with the virtual agent via an application programming interface (API). Additionally, a transformation script may be used to configure the third party NLU service to seamlessly operate with the virtual agent, such as by defining one or more suitable transformation layers through which communications to and from the third party NLU service are directed. Indeed, as may be understood, the transformation layers facilitate appropriate communications between, and integration of, the virtual agent and the third party NLU service. For example, when the virtual agent receives an utterance from a user via a chat session, the virtual agent may condition or process the utterance for submittal to the third party NLU service via an input transformation layer. Relative to the original utterance, the conditioned utterance may be abstracted, cleansed, or otherwise modified by the input transformation layer into a form that is efficiently interpretable by the third party NLU service.

After submitting the utterance through the input transformation layer to the third party NLU service, the virtual agent may direct a reply from the third party NLU service through an output transformation layer, which may condition or adapt the reply for consumption or utilization by the virtual agent. The input and output transformation layers may be established via a transformation script that suitably integrates the third party NLU service with the virtual agent. As discussed below, a type of the reply that the third party NLU service returns through the output transformation layer and to the virtual agent may depend on a user-selectable degree on integration between the third party NLU service and the virtual agent. For example, in some embodiments, the third party NLU service may return intents, entities, and confidence scores extracted from the utterance to the virtual agent, therefore enabling the virtual agent to generate a response to the utterance via the in-house NLU service. In other, more integrated embodiments, the third party NLU service may go as far as generating a response and/or taking actions within a computing environment of the cloud-based platform, such as via the API. In either case, the virtual agent then provides a response to the user via the chat session, thereby efficiently reacting to utterances via operations supplemented by the integrated third party NLU service.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
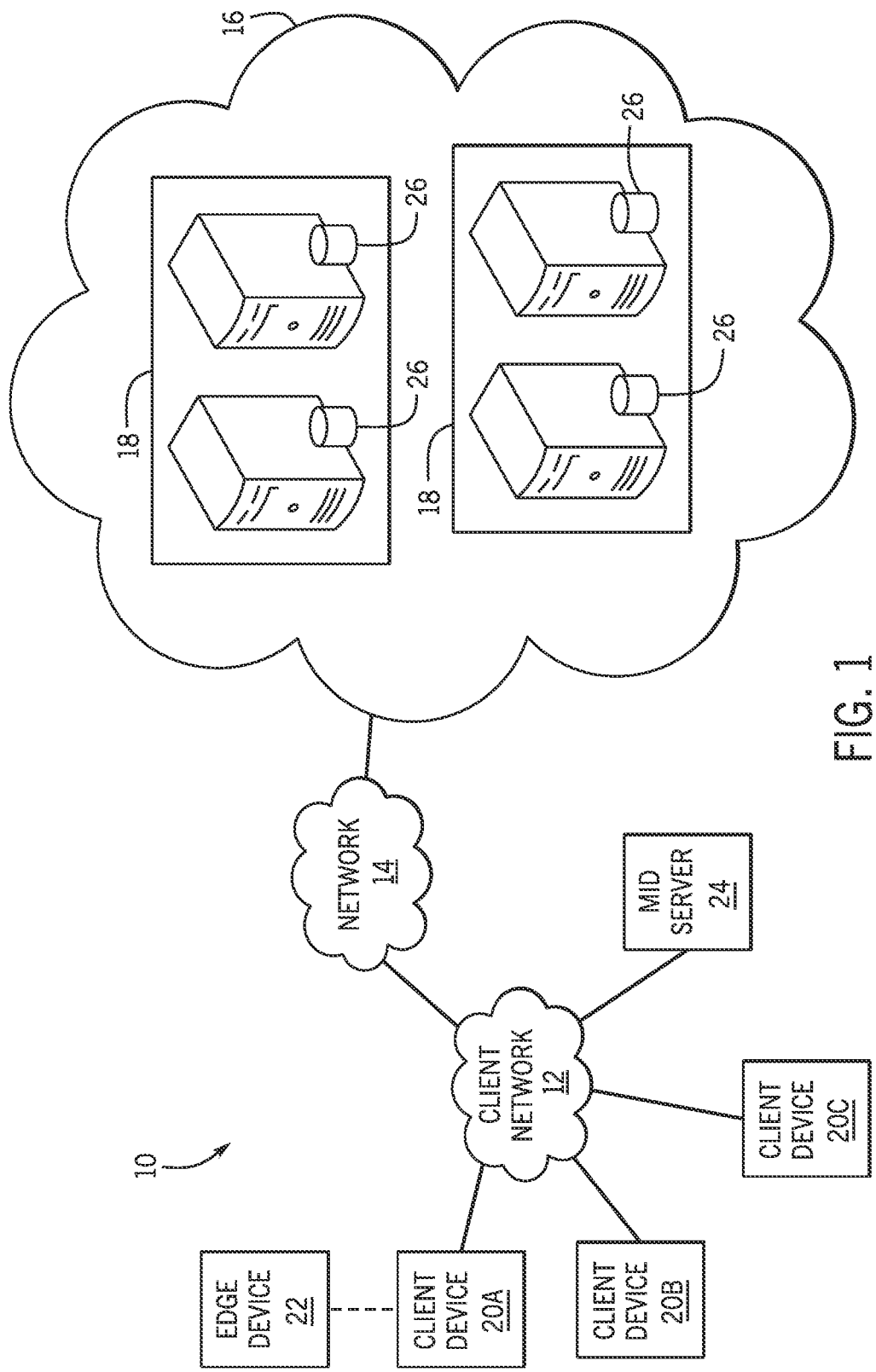
FIG. 1 is a block diagram of an embodiment of a multi-instance cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads, and/or a set of computing instructions executed by a computing system. Example embodiments of applications include software modules, software objects, software instances, and/or other types of executable code.

As used herein, an "utterance" refers to a string of natural language text received from a user. As used herein, a "conversation" refers to an exchange of natural language requests and responses between a user and a virtual agent via a particular conversational channel or medium (e.g., chat rooms, email, forum posts, and so forth). A non-limiting list of example utterances includes chat entries, email subjects, incident descriptions, and so forth, though it should be understood that verbal or spoken utterances may also be utilized by the present techniques. As used herein, an "intent" refers to something indicated in an utterance that a user wants to achieve or accomplish, such as an underlying goal or desire of the user. As used herein, an "entity" refers to a portion of an utterance that is the subject, object, context, and/or some other parameterization of an intent. For example, in a user utterance "please update my password," "password" may be identified as an entity associated with an intent of "update." As used herein, a "virtual agent" refers to an application that is associated with an in-house natural language understanding (NLU) service and that is configured to receive and suitably respond to user utterances based on the intents and entities identified in user utterances within a conversational channel. As used herein, an "in-house NLU service" refers to a service that hosts the virtual agent and is native to a provider associated with a cloud-based platform, while a "third party NLU service" refers to a service that is distinct or independent from the in-house NLU service that hosts the virtual agent.

Present embodiments are directed to systems and methods that facilitate integration of a third party NLU service into a virtual agent. The virtual agent may utilize an in-house NLU service associated with a cloud-based platform that supports the virtual agent, which may communicate with the third party NLU service through an application programming interface (API). To configure the third party NLU service to efficiently supplement operations of the virtual agent, present embodiments provide one or multiple transformation scripts that define any suitable number of transformation layers. As discussed below, the transformation layers may operate as communication conditioners between the third party NLU service and the virtual agent. For example, the transformation scripts may provide an input transformation layer through which the virtual agent directs user utterances, as well as an output transformation layer through which the virtual agent receives responses from the third party NLU service. The transformation layers may condition, process, or reformat the communications between the virtual agent and the third party NLU service, such as via abstraction, cleansing, parsing, and so forth.

Moreover, a degree of integration, as well as the particular third party NLU service, may be individually selected by a customer that provides the virtual agent to users. For example, depending on the degree of integration of the third party NLU service with the in-house NLU service, the third party NLU service may either return intents, entities, and confidence scores extracted from the user utterances to the virtual agent, or, alternatively, generate a response and/or take actions within the cloud-based platform. In either case, the virtual agent may provide a response to the user, thereby efficiently reacting to utterances via operations supplemented by the integrated third party NLU service to improve the overall experience of the user when interacting with the virtual agent.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10, where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
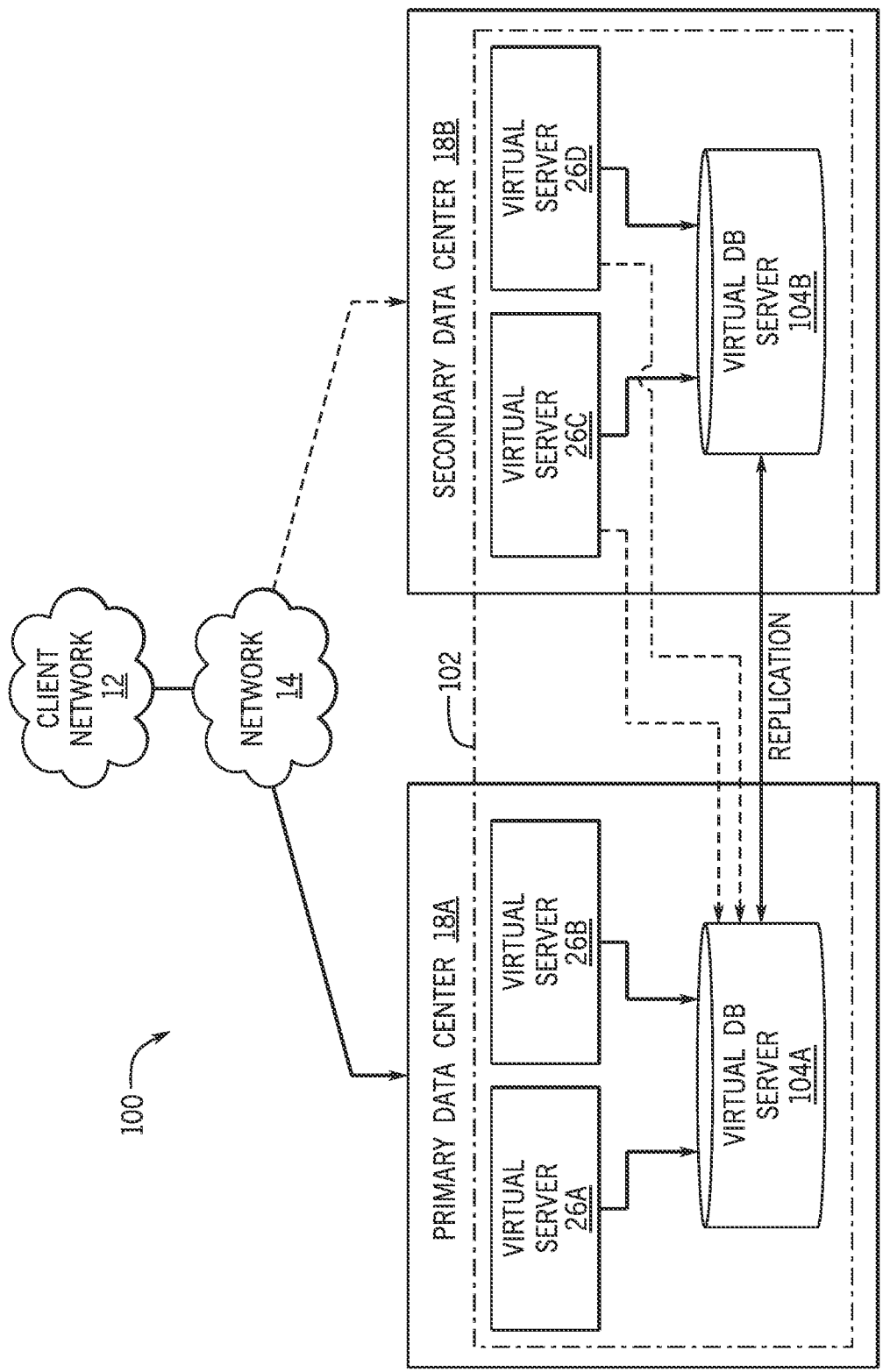
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
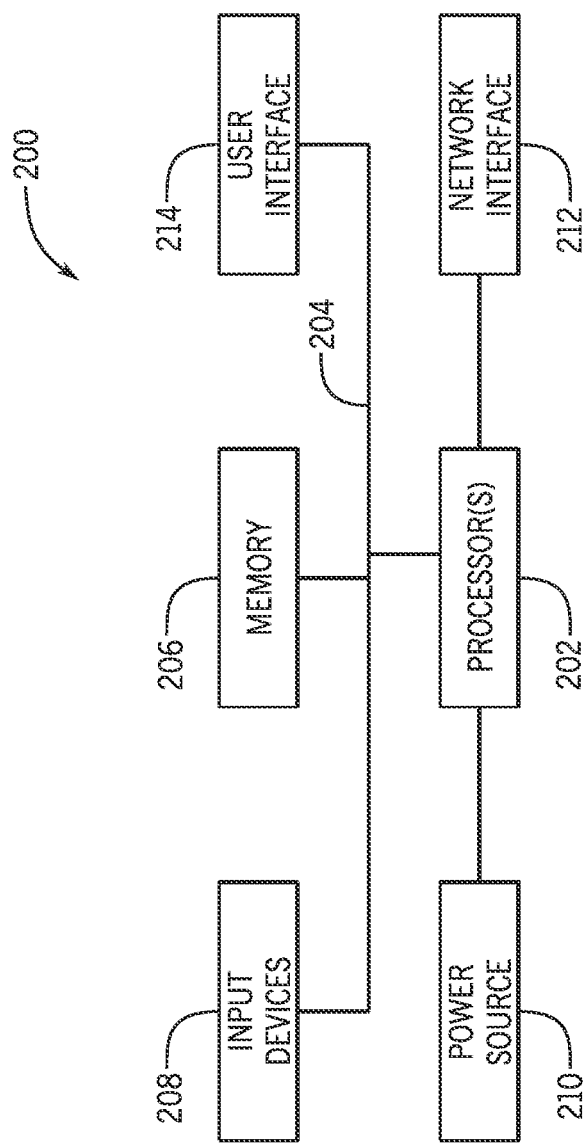
FIG. 3 is a block diagram of a computing system utilized in the architecture of FIG. 1 or 2, in accordance with aspects of the present disclosure.

By way of background, it may be appreciated that the present approach may be implemented using one or more processor-based systems, such as those shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard, and the like. The power source 210 can be any suitable source for power of the various components of the computing system 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
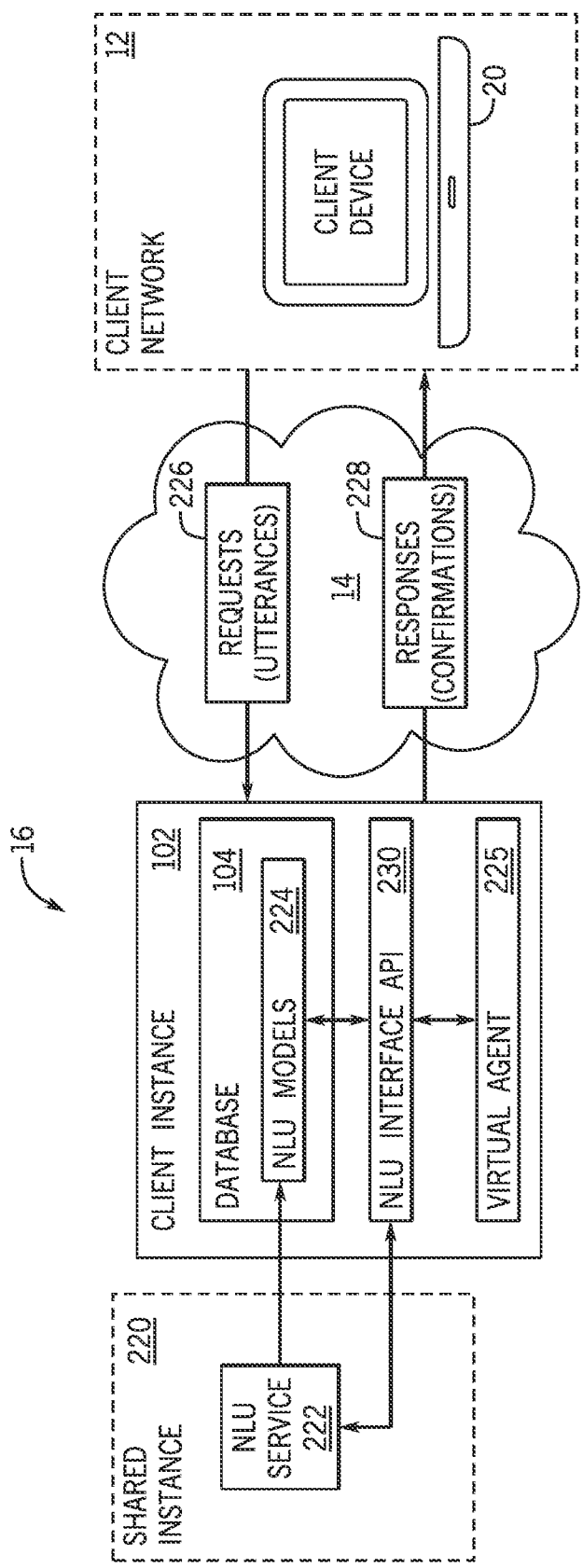
FIG. 4 is a block diagram illustrating an embodiment in which a virtual server supports and provides a virtual agent to a client instance of FIG. 2, in accordance with aspects of the present disclosure.

FIG. 4 illustrates an example of a portion of a service provider cloud infrastructure, including the cloud-based platform 16 discussed above. The cloud-based platform 16 is connected to a client device 20 via the network 14 to provide a user interface to network applications executing within the client instance 102 (e.g., via a web browser of the client device 20). Cloud provider infrastructures are generally configured to support a plurality of end-user devices, such as client device 20, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser.

For the illustrated embodiment, the client instance 102 is communicatively coupled to a shared instance 220 of the cloud-based platform 16. The shared instance 220 hosts a NLU service 222 that may be used by any suitable number of client instances to provide NLU facilities or functionality. For example, in certain embodiments, the NLU service 222 is capable of analyzing a collection or corpus of utterances (e.g., chat sessions, email exchanges, forum posts) stored by the database server 104 of the client instance 102 to generate one or more NLU models 224, which may be compiled to form suitable intent-entity models. In other embodiments, the NLU models 224 may be manually created by a developer or designer. As used herein, a "NLU model" is a collection of intents and entities that are defined alongside annotated, sample utterances of these intents and entities. For example, a "purchase product" intent of the NLU model may be associated with one or more sample utterances that each have one or more labeled entities belonging to the intent, such as a "brand" entity, a "model" entity, a "color" entity, a "size" entity, a "shipping address" entity, and so forth, depending on the nature of the product. The NLU models 224 may be vector space representations of intents and entities that the NLU service 222 uses as a reference for identifying or inferring intents and entities in newly received utterances. In certain embodiments, these generated NLU models 224 may be stored by the database server 104 of the client instance 102, as illustrated in FIG. 4. It may be appreciated that, in other embodiments, the NLU service 222 may be an external service that is communicatively coupled to the client instance 102 via the network 14.

For the illustrated embodiment, the client instance 102 includes a virtual agent 225 that is designed to receive natural language requests as utterances 226 from a user of the client device 20 and to respond accordingly. In certain cases, the responding virtual agent 225 may perform actions within the client instance 102 and/or provide a response 228 or confirmation message to the user of the client device 20. The utterance 226 and/or the response 228 may be in the form of a written natural language request or communication, such as chat messages, email messages, forum posts, and so forth. Additionally, the client instance 102 includes a NLU interface application programming interface (API) 230 that enables the client instance 102 to provide received utterances 226 and NLU models 224 to the NLU service 222 for processing. Upon receipt, the NLU service 222 searches the NLU models 224 for intents and/or entities indicated in the utterance 226, such as based on the sample utterances stored in the NLU models 224. In response, the NLU service 222 may provide a scored set (e.g., a list or table) of intents and entities identified in the utterance 226 to the virtual agent 225, wherein the scored set of intents and entities includes corresponding confidence scores for each of the identified intents and/or entities. The virtual agent may therefore 225 be designed to execute particular flows (e.g., topic flows, conversational flows) in response to certain intents and/or entities being identified in the utterance 226 at various points in the conversation.

Moreover, in some cases, a customer may wish to use a third party NLU service to complement, supplement, or replace the NLU service 222 that is native to the cloud-based platform 16 when providing automated chat services to one or more users. For example, in situations in which a customer is first joining the cloud-based platform 16 and already familiar with a particular third party NLU service, the customer may desire to retain the ability to access certain features or interact in a similar way with the particular third party NLU service. Accordingly, the service provider cloud infrastructure may be designed to integrate a third party NLU service therein to complement, supplement, or replace the NLU service 222, which is also referred to herein as a native or in-house NLU service 222. As discussed below, the present techniques may therefore integrate operation of the third party NLU service with the virtual agent 225 within a cohesive electronic environment, such that the customer is able to efficiently deliver impactful solutions to end-users from within a single client instance 102.

Figure 5:
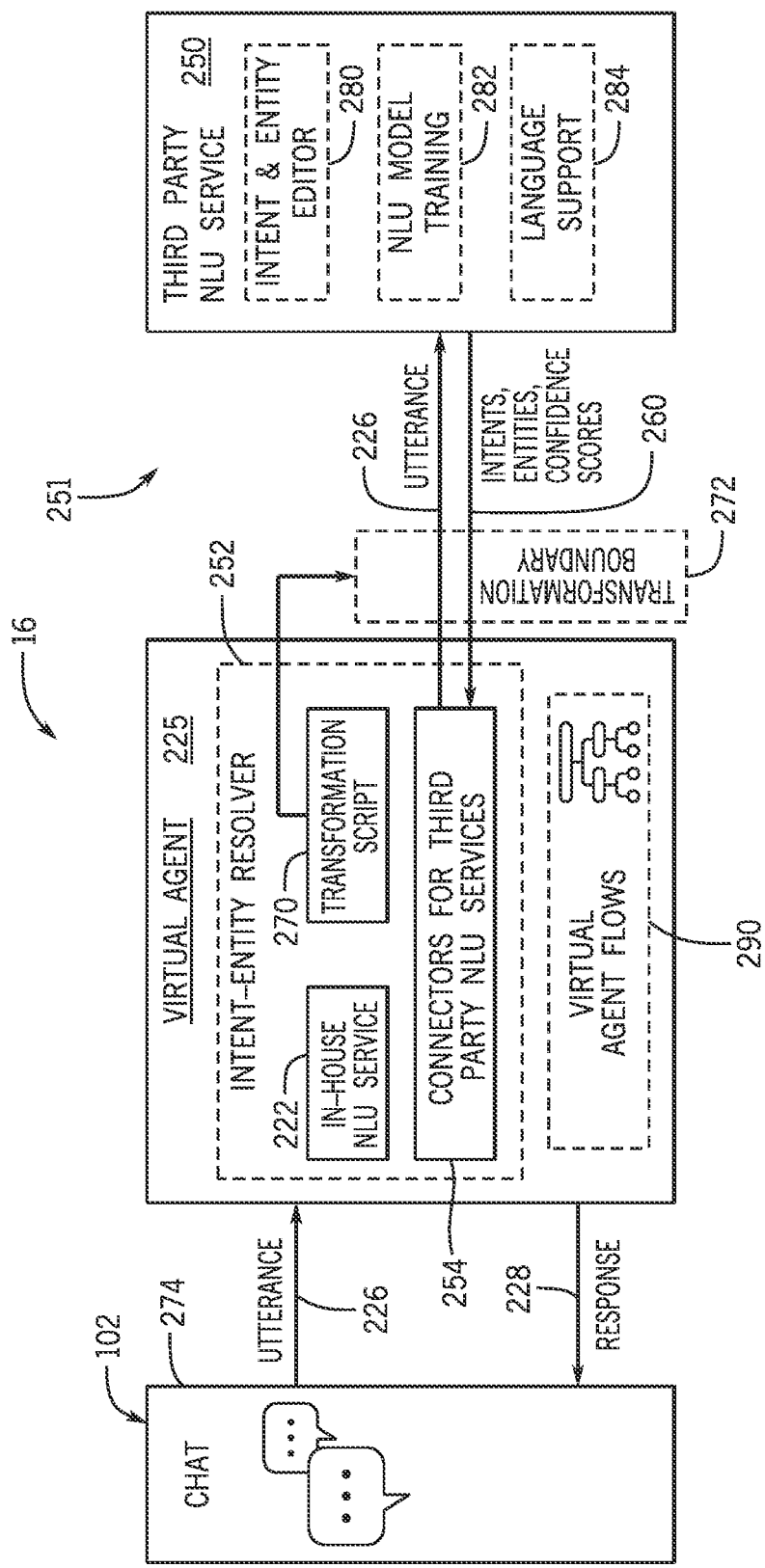
FIG. 5 is a block diagram illustrating an embodiment of a third party NLU service integrated with the virtual agent of FIG. 4, in accordance with aspects of the present disclosure.

FIG. 5 illustrates a third party NLU service 250 integrated with the virtual agent 225 of the cloud-based platform 16 to form an integrated NLU service system 251. As shown, the virtual agent 225 includes an intent-entity resolver 252, which has access to (e.g., is communicatively coupled to) the in-house NLU service 222, as well as the third party NLU service 250. For example, the intent-entity resolver 252 may include connectors 254 or drivers for the third party NLU service 250 that enable communications therebetween, such as by providing one or more APIs. The third party NLU service 250 may include any suitable NLU services or systems that may augment operation of the in-house NLU service 222 and/or the cloud-based platform 16 thereof. For example, the third party NLU service 250 may include PARLO, IBM WATSON, MICROSOFT LUIS, GOOGLE BERT, AMAZON ALEXA, etc. In some embodiments, one of the connectors 254 may be included within the intent-entity resolver 252 for each particular third party NLU service 250 that may be integrated with the in-house NLU service 222. In other embodiments, a single connector 254 may enable the virtual agent 225 to communicate with multiple third party NLU services 250. The intent-entity resolver 252 may also include or be coupled to any additional components that enable the virtual agent 225 to interface with the third party NLU service 250, such as a database storing user credentials for the APIs that enable authorized access to the third party NLU service 250.

In some embodiments, customers may desire to utilize NLU processing features of the third party NLU service 250, while maintaining conversation design functionality within a same environment as the virtual agent 225. As such, in the present embodiment of the integrated NLU service system 251, the third party NLU service 250 has a lesser degree of integration with the virtual agent 225, compared to certain embodiments having greater degrees of integration and discussed in more detail below. Therefore, the third party NLU service 250 may extract a set 260 of intents, entities, and/or confidence scores from the utterances 226 received from the user and provide the set 260 of intents, entities, and/or confidence scores to the virtual agent 225. As mentioned above, the confidence scores may be used to score the intents and/or entities of the set 260, thereby forming a scored or ranked set of intents and/or entities. Indeed, from the utterances 226, the third party NLU service 250 may rank each intent and any corresponding entities thereof with a respective confidence score that indicates a likelihood of correspondence to the originating utterance 226.

As presently recognized, a transformation script 270 (e.g., transformation program) of the intent-entity resolver 252 may be used to configure the third party NLU service 250 for use with the virtual agent 225 at any desired degree of integration. Indeed, for rapid onboarding, the virtual agent 225 may be integrated with any suitable third party NLU service 250 by defining the transformation script 270 to resolve any differences in communication between the virtual agent 225 and the third party NLU service 250. For example, the transformation script 270 may define a transformation boundary 272, having one or more transformation layers discussed below, that enables the virtual agent 225 to perform processing or adjustment on communications between the virtual agent 225 and the third party NLU service 250. Indeed, the transformation boundary 272 may map the one or more intents and the one or more entities of the set 260 to a model, such as a language model and/or the NLU models 224 discussed above.

In some embodiments, the transformation script 270 includes multiple code portions, which are each individually tailored or constructed to provide a respective transformation layer that enables the virtual agent 225 to perform a conditioning process on communications in response to identifying a particular feature in a communication. As such, the virtual agent 225 of certain embodiments receives the utterance 226 from a chat window 274 associated with a chat session of the client instance 102. Then, the virtual agent 225 provides the utterance 226 through the transformation boundary 272 and to the third party NLU service 250, such as via one of the APIs. In other words, the transformation boundary 272 may enable the virtual agent 225 to perform processing or pre-processing on the utterance 226 before it is provided to the third party NLU service 250, thereby adjusting the utterance 226 for efficient consumption by the third party NLU service 250.

Although sometimes described as passing communications through the transformation boundary 272, it should be understood that the virtual agent 225 (e.g., or any suitable virtual or physical processing components thereof) may include the transformation boundary 272 therein and perform the conditioning processes of the transformation boundary 272 discussed below. Moreover, certain embodiments may utilize or compile the transformation script 270 to generate or establish the transformation boundary 272 as or within a processing entity that is distinct from, and communicatively coupled to, the virtual agent 225.

Focusing now on the third party NLU service 250, the third party NLU service 250 may then leverage its processing techniques to extract any intents and entities from the processed utterance 226, as well as to generate confidence scores for the extracted intents and entities. In the illustrated example, the third party NLU service 250 may include an intent and entity editor 280, NLU model training 282, language support 284, and so forth. In the present embodiment, the intent and entity editor 280 and the NLU model training 282 of the third party NLU service 250 may interoperate to generate the set 260 of intents, entities, and confidence scores, such that the language support 284 for generating particular responses is not utilized. It should be understood that the third party NLU service 250 may include any suitable components that facilitate efficient intent and/or entity extraction or identification. Moreover, in some embodiments, the third party NLU service 250 may centrally manage conversation logic for the user to provide cohesive intent resolution. The third party NLU service 250 may then provide the set 260 of intents, entities, and confidence scores to the virtual agent 225 through the transformation boundary 272, which may condition, process, or otherwise translate the set 260 for more efficient utilization by the virtual agent 225.

As discussed above with reference to FIG. 4, the virtual agent 225 may then implement the in-house NLU service 222 and virtual agent flows 290 of the virtual agent 225 to generate the response 288 based on the set 260 of intents, entities, and confidence scores. The virtual agent flows 290 may include any suitable topic flows, scripts, or processes that the virtual agent 225 may execute in response to intents identified by the third party NLU service 250. For example, the virtual agent flows 290 may each be designed to enable the virtual agent 225 to perform one or more actions to address a particular topic or intent provided by a user, such as by scheduling a delivery or meeting, ordering a product, accessing a particular computing environment, updating profile information, monitoring a status of a process, and so forth. Based on identification of a virtual agent flow 290 that corresponds to the identified intent, the virtual agent 225 may then generate and transmit the response 228 to the user via the chat window 274.

As presently recognized, by generating the response 228 based on the set 260 of intents, entities, and confidence scores, the in-house NLU service 222 may efficiently generate the response 228 based on native, customer-designed topic flows associated with the cloud-based platform 16, while also enabling efficient actions to be performed in response to the utterance 226. That is, the customer may build or define the virtual agent flows 290 that are particularly suited to the customer's business goals. As a particular example, in response to the third party NLU service 250 extracting an intent of "change" and an entity of "password," the in-house NLU service 222 may identify the appropriate virtual agent flow 290 regarding a password change and instruct the virtual agent 225 to transmit the response 228 of "what would you like your password updated to?" The in-house NLU service 222 may therefore update the password of the user in response to receiving an appropriate password input.

Further, it should be noted that the in-house NLU service 222 may also perform slot filling with respect to the virtual agent flows 290. That is, instead of requesting information that the user may have already provided in an utterance 226, the in-house NLU service 222 may store or fill suitable intents and/or entities within corresponding fields of the virtual agent flows 290. Similar to the above example, if the third party NLU service 250 identifies that the utterance 226 includes the "change" intent, the "password" entity, and another entity parameter that corresponds to a new password, the virtual agent 225 may respond to indicate that the user's password has been updated to the new password. Indeed, enabling the virtual agent 225 to enhance operation of the in-house NLU service 222 with the integrated third party NLU service 250 may provide improved and effective conversation flows for end-users, who may be interested in resolving their requests without interfacing with human support agents. Moreover, because certain traditional NLU services may not incorporate slot filling or other desirable features of the user-definable virtual agent flows 290, the customer may implement beneficial qualities of both the virtual agent 225 and the integrated third party NLU service 250 via the presently provided integrated NLU service system 251.

Figure 6:
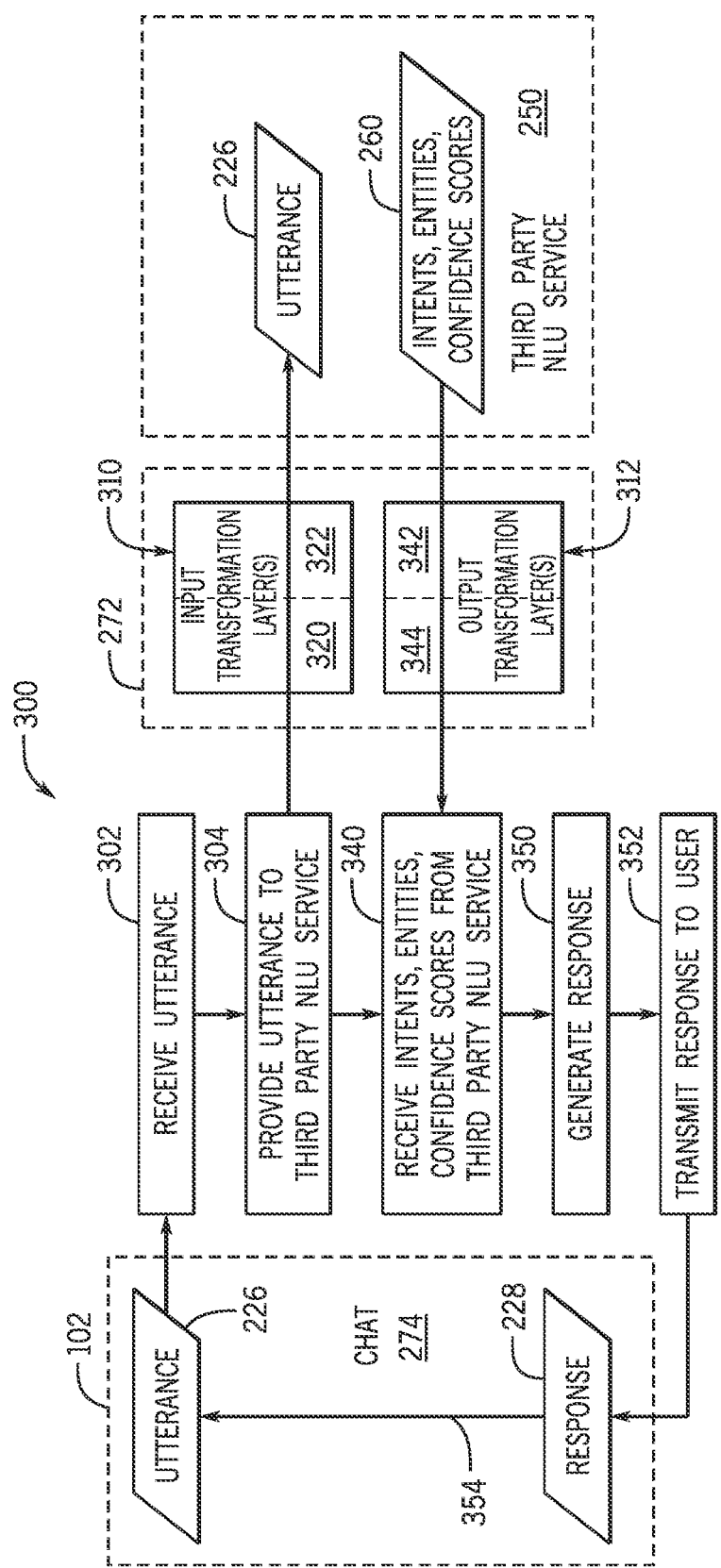
FIG. 6 is a flow chart illustrating an embodiment of a process by which the integrated third party NLU service of FIG. 5 facilitates a chat conversation by generating intents, entities, and confidence scores from user utterances, in accordance with aspects of the present disclosure.

Keeping the above example of certain components of the cloud-based platform 16 and virtual agent 225 in mind, FIG. 6 is a flow chart of a process 300 by which the virtual agent 225 may conduct a chat conversation with a user via the third party NLU service 250. The steps illustrated in the process 300 are meant to facilitate discussion and are not intended to limit the scope of this disclosure, because additional steps may be performed, certain steps may be omitted, and the illustrated steps may be performed in an alternative order or in parallel, where appropriate. The steps illustrated in the process 300 are performed by the virtual agent 225, which, as discussed above, may be supported by the cloud-based platform 16 and communicatively coupled to the third party NLU service 250 within the integrated NLU service system 251. As discussed below, the third party NLU service 250 may generally provide external processing power to generate the set 260 of intents, entities, and/or confidence scores in response to utterances 226, thereby supplementing operation of the virtual agent 225.

In the depicted embodiment, the process 300 begins by the virtual agent 225 receiving (block 302) an utterance 226 that the user provides to the chat window 274. As mentioned above, the utterance 226 may be a request for the virtual agent 225 to provide information or perform actions within the cloud-based platform 16. The virtual agent 225 may then provide (block 304) the utterance 226 to the third party NLU service 250 through the transformation boundary 272. As discussed above, the transformation boundary 272 may be generated by executing the transformation script 270 that configures the third party NLU service 250 to operate with the virtual agent 225. The transformation boundary 272 may include one or more input transformation layers 310 that condition the communications sent to the third party NLU service 250, as well as one or more output transformation layers 312 that condition the communications received from the third party NLU service 250.

As mentioned above and described in more detail herein, the virtual agent 225 implements the input transformation layers 310 of the transformation boundary 272 to perform processing or pre-processing of the utterance 226, before providing the utterance 226 to the third party NLU service 250. For example, the virtual agent 225 may direct the utterance 226 through the input transformation layers 310 to condition, abstract, distill, cleanse, or otherwise adjust the utterance 226 into a suitable conditioned utterance that is an efficient input for the third party NLU service 250. As particular examples, the input transformation layers 310 implemented by the virtual agent 225 may correct grammar, adjust vocabulary, remove emojis, segment, separate conjunctions, replace slang terms and/or colloquialisms, and/or otherwise condition the utterance 226. Indeed, certain third party NLU services 250 may be more efficient at analyzing short, individual, or single intent utterances 226, such that the input transformation layers 310 are particularly generated to segment or parse complex utterances 226 into segments (e.g., intent segments) for more efficient consumption by the certain third party NLU services 250.

It should be understood that the input transformation layers 310 may include any suitable number of layers, which may each perform one or multiple conditioning processes. For example, in embodiments in which the input transformation layers 310 include a first input layer 320 and a second input layer 322, the first input layer 320 may perform a first portion of the conditioning that is generic or universal to multiple third party NLU services 250, while the second input layer 322 performs a second portion of the conditioning that is specific or individualized to the particular third party NLU service 250 presently integrated with the virtual agent 225. By performing more universal conditioning processes (e.g., correcting grammar) before more specific conditioning processes (e.g., segmenting, parsing), the virtual agent 225 implementing the input transformation layers 310 may increase an efficiency and/or accuracy of the more specific conditioning processes to improve understanding of the utterance 226.

Moreover, certain embodiments of the transformation script 270 may be designed to position the input transformation layers 310 in any suitable, adjustable order, which may be modified based on a detected type or content of the utterance 226. That is, a first conditioning process may be performed before a second conditioning process in response to determining that the particular content of the utterance 226 would be better adapted for consumption by the third party NLU service by performing the first conditioning process before the second conditioning process. In other embodiments, the input transformation layers 310 may each condition the utterance 226 in parallel with one another.

Based on the utterance 226, the third party NLU service 250 may extract one or more intents, extract any entities associated with the intents, and generate confidence scores for the intents and entities, thereby generating the set 260 of intents, entities, and confidence scores discussed above. Then, the virtual agent 225 may receive (block 340) the set 260 of intents, entities, and confidence scores through the output transformation layers 312 of the transformation boundary 272. The output transformation layers 312 may condition the set 260 of intents, entities, and confidence scores in any suitable manner for efficient utilization by the virtual agent 225, such as by processing, rewording, de-abstracting, combining, or otherwise processing the set 260. As mentioned with respect to the input transformation layers 310, the output transformation layers 312 may also include any suitable number of layers, which perform single or multiple conditioning processes and which may be ordered in a static or dynamic manner. Indeed, the output transformation layers 312 may include a first output layer 342 that is specific or tailored to the particular third party NLU service 250, as well as a second output layer 344 that performs more generic or universal conditioning of the set 260. In contrast to the input transformation layers 310, certain embodiments of the output transformation layers 312 may enable the virtual agent 225 to perform certain third party-specific conditioning processes, before performing more universal or generic conditioning processes, to efficiently transform the set 260 for utilization by the virtual agent 225. However, it should be understood that each of the input transformation layers 310 and the output transformation layers 312 may be a single layer or conditioning process, set forth by the transformation script 270, to adapt or modify communications in a single step.

After the virtual agent 225 receives the conditioned or transformed set 260 of intents, entities, and confidence scores through the output transformation layers 312, the virtual agent 225 may generate (block 350) a response 228 to the utterance 226. In some embodiments, the virtual agent 225 may generate the response 228 by instructing the in-house NLU service 222 to evaluate the set 260 of intents, entities, and confidence scores and identify intent candidates having at least a threshold confidence score. The virtual agent 225 may therefore identify an appropriate virtual agent flow 290, as discussed above, to efficiently address identified intents along with any associated entities. The virtual agent 225 may therefore transmit (block 352) the response 228 to the user via the chat window 274. Indeed, as mentioned above, generating the response 228 in-house or within the virtual agent 225 may improve user experience by leveraging the virtual agent flows 290 that may have been particularly generated within the cloud-based platform 16. Then, as indicated by arrow 354, should the user respond with a subsequent utterance, the process 300 may begin again.

In some embodiments, the customer may wish to more fully integrate the third party NLU service 250 within the cloud-based platform 16. For example, if a customer has traditionally utilized the third party NLU service 250 and established customer-specific topic flows within an associated third party environment, the customer may wish to migrate or transition the capabilities and trained operation of the third party NLU service 250 within the client instance 102. To enable the customer to transition to the cloud-based platform 16 in a streamlined manner with limited frustrations, the present integration techniques also support operation of the virtual agent 225 as a proxy to the third party NLU service 250, as discussed below.

Figure 7:
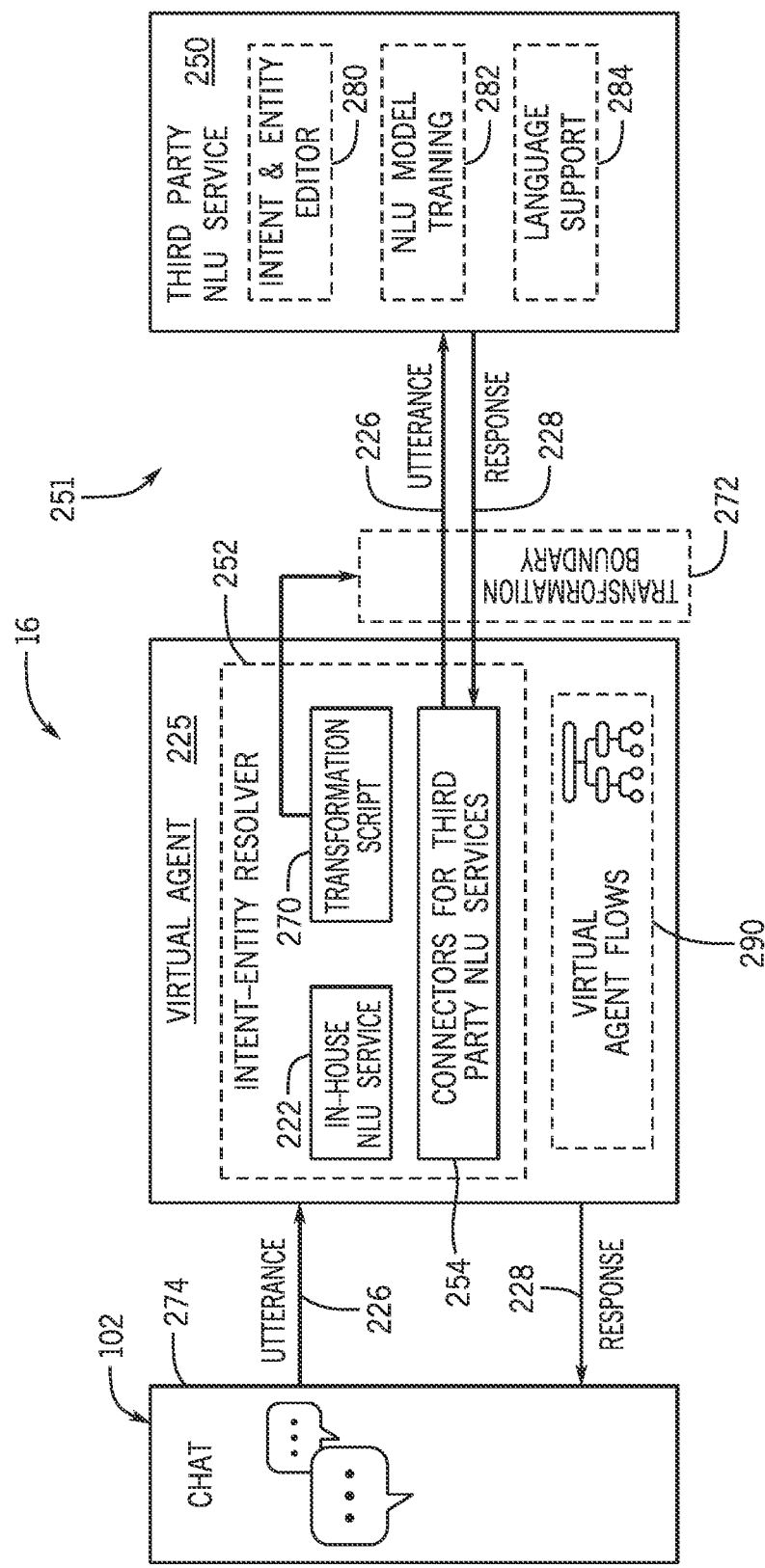
FIG. 7 is a block diagram illustrating the third party NLU service integrated with the virtual agent of FIG. 4 such that the third party NLU service generates responses to user utterances, in accordance with aspects of the present disclosure.

FIG. 7 illustrates a third party NLU service 250 integrated with a virtual agent 225, such that the third party NLU service 250 generates the response 228 to the utterance 226. For example and as mentioned above, the customer may wish to configure fuller integration of the third party NLU service 250 to generate the responses 228, rather than providing the set 260 of intents, entities, and confidence scores. In such an embodiment, the virtual agent 225 provides the third party NLU service 250 with the utterance 226 from the chat window 274. As previously described, the virtual agent 225 may perform some amount of processing on the utterance 226, such as set forth by the input transformation layers 310 of the transformation boundary 272. Indeed, as discussed above, the transformation boundary 272 may enable the virtual agent 225 to efficiently massage or rework communications between the virtual agent 225 and the third party NLU service 250, thereby optimizing or improving operation of the third party NLU service 250. It should be understood that some embodiments of the virtual agent 225 may, however, determine that the utterance 226 is in a suitable form without preprocessing and provide the utterance 226 directly to the third party NLU service 250, such as it was received through the chat window 274. The third party NLU service 250 may then extract intents and entities with associated confidence scores (e.g., via the intent and entity editor 280 and/or the NLU model training 282), and formulate the response 228 (e.g., via the language support 284). The response 228 is then provided to the virtual agent 225 (e.g., via an API). The virtual agent 225 may or may not perform some amount of processing on the response generated by the third party NLU service via the transformation boundary 272, before providing the response 228 to the user via the chat window 274.

Figure 8:
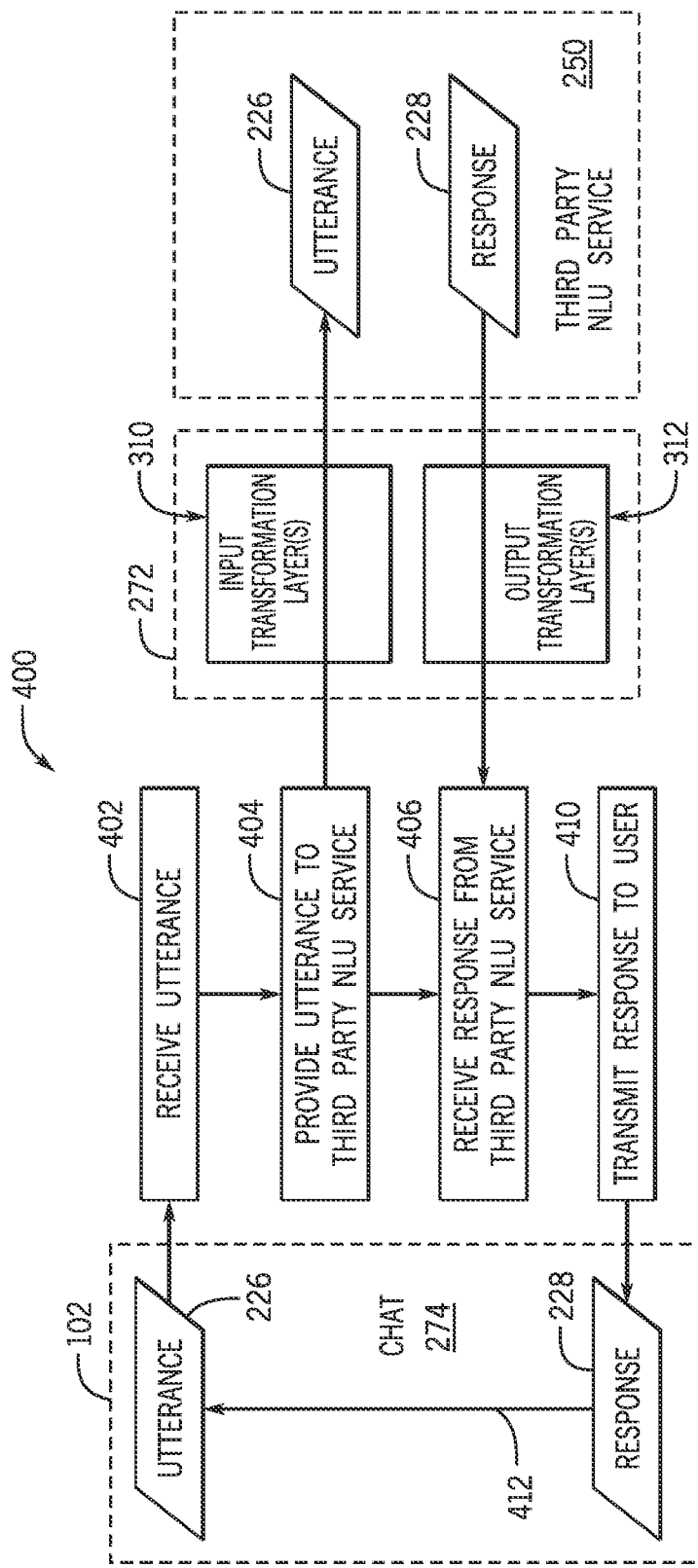
FIG. 8 is a flow chart illustrating an embodiment of a process by which the integrated third party NLU service of FIG. 7 facilitates a chat conversation by generating responses to the user utterances, in accordance with aspects of the present disclosure.

FIG. 8 is a flow chart for a process 400 by which the virtual agent 225 may conduct a chat conversation with the third party NLU service 250 configured to generate responses to utterances. The steps illustrated in the process 400 are meant to facilitate discussion and are not intended to limit the scope of this disclosure, because additional steps may be performed, certain steps may be omitted, and the illustrated steps may be performed in an alternative order or in parallel, where appropriate. The steps illustrated in the process 400 are performed by the virtual agent 225, which, as discussed above, may be supported by the cloud-based platform 16 and communicatively coupled to the third party NLU service 250 within the integrated NLU service system 251.

In the illustrated embodiment, the process 400 begins with the virtual agent 225 receiving (block 402) an utterance 226 that the user provides to the chat window 274. As shown, the transformation script 270 is received and run to configure the third party NLU service 250 to operate with the virtual agent 225. As discussed above with reference to the process 300 of FIG. 6, the virtual agent 225 may provide (block 404) the utterance 226 to the third party NLU service 250 through the transformation boundary 272, which may be established by executing the transformation script 270. The transformation script 270 is designed to be run to configure the third party NLU service 250 to operate with the virtual agent 225, such as by providing instructions for pre-processing the utterance 226 and mapping intents and entities to language models, the NLU models 224, and so forth.

In some embodiments, the utterance 226 may be accompanied by an indication that the virtual agent 225 expects the third party NLU service 250 to generate the response 228. However, it should be understood that the degree of integration between the virtual agent 225 and the third party NLU service 250 may additionally or alternatively be user-set via a setting associated with the cloud-based platform 16 and/or based on an identified type of conversation indicated in the utterance 226. The third party NLU service 250 then extracts one or more intents and one or more entities from the utterance 226 and generates confidence scores for the intents and entities. The third party NLU service 250 may then go further to generate the response 228 based on the intents, entities, and confidence scores, such that the virtual agent 225 receives (block 406) the response 228 from the third party NLU service 250. In some embodiments, the virtual agent 225 may perform some processing or pre-processing of the response 228, such as via the one or more output transformation layers 312 of the transformation boundary 272 discussed above. The virtual agent 225 may therefore transmit (block 410) the response 228 to the user via the chat window 274. If the user responds with another utterance 226, the process 400 may begin again, as indicated by arrow 412.

Figure 9:
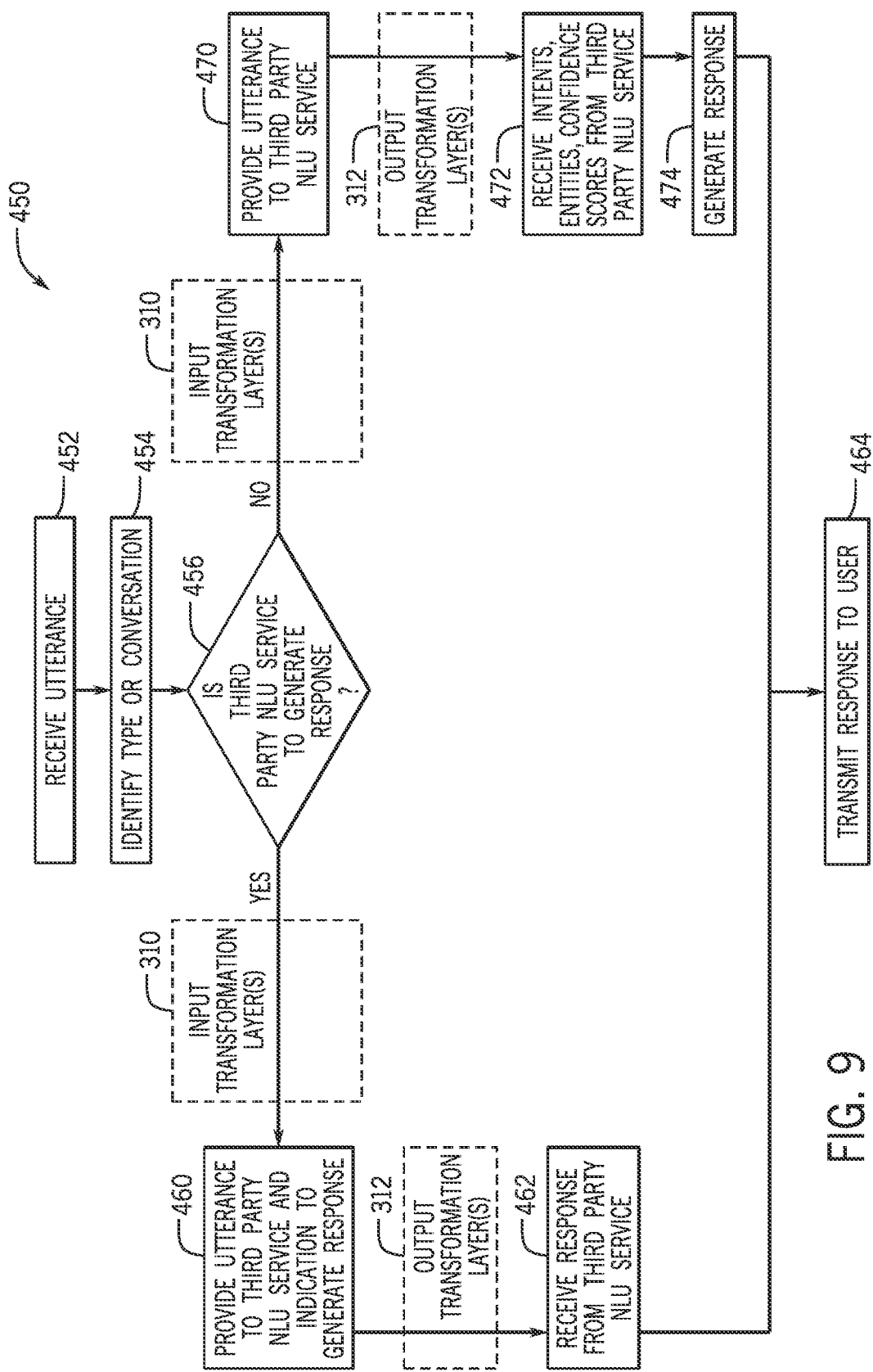
FIG. 9 is a flow chart illustrating an embodiment of a process for toggling between the third party NLU service generating the response and an in-house NLU service generating the response, such as based on a type of conversation being conducted, in accordance with aspects of the present disclosure.

It should be understood that there may be varying degrees of integration between the virtual agent 225 and the third party NLU service 250. For example, in some embodiments, the virtual agent 225 may allow the third party NLU service 250 to take certain actions within the instance or cloud-based platform 16 via any suitable APIs. As such, the customer may configure the level of integration between the virtual agent 225 and the third party NLU service 250 to the desired level. Further, the customer may configure the level of integration between the virtual agent 225 and the third party NLU service 250 to adjust based on the action or actions to be performed. For example, FIG. 9 is a flow chart of a process 450 for toggling between the third party NLU service 250 generating the response 228 and the in-house NLU service 222 generating the response 228, based on the type of conversation being conducted. The steps illustrated in the process 450 are meant to facilitate discussion and are not intended to limit the scope of this disclosure, because additional steps may be performed, certain steps may be omitted, and the illustrated steps may be performed in an alternative order or in parallel, where appropriate. The steps illustrated in the process 450 are performed by the virtual agent 225, which, as discussed above, may be supported by the cloud-based platform 16 and communicatively coupled to the third party NLU service 250 within the integrated NLU service system 251.

As shown, the process 450 may begin with the virtual agent 225 receiving (block 452) an utterance 226 and performing some processing or preprocessing of the utterance to identify (block 454) the type of conversation taking place. The virtual agent 225 then determines (block 456) whether the third party NLU service 250 is to generate the response 228 for the identified type of conversation. For example, the integrated NLU service system 251 may be configured such that the third party NLU service 250 generates the responses 228 for simpler conversations, such as exchanging pleasantries, for which access to certain types of data is not needed.

If the third party NLU service 250 is to generate the response, the virtual agent 225 provides (block 460) the third party NLU service 250 with the utterance 226, such as through the one or more input transformation layers 310 discussed above. The third party NLU service 250 then extracts the set 260 of intents and entities, generates confidence scores, and then formulates a response 228. The virtual agent 225 may therefore receive (block 462) the response 228. The virtual agent 225 may or may not perform some amount of processing on the response 228 generated by the third party NLU service 250 via the instructions included in the one or more output transformation layers 312, before transmitting (block 464) the response to the user via the chat window 274 discussed above.

If the third party NLU service 250 is not to generate the response 228, the virtual agent 225 provides (block 470) the third party NLU service 250 with the utterance 226. The third party NLU service 250 extracts one or more intents and one or more entities from the utterance 226 and generates confidence scores for the intents and entities. The virtual agent 225 may therefore receive (block 472) the set 260 of intents, entities, and confidence scores from the third party NLU service 250. In some embodiments, the set 260 is conditioned for consumption by the virtual agent 225 via the one or more output transformation layers 312 discussed above. The virtual agent 225 then generates (block 474) the response 228 to the utterance 226 based on the set 260 of intents, entities, and confidence scores received from the third party NLU service 250. The virtual agent 225 may therefore transmit (block 464) the response 228 to user via the chat window 274. If the user responds with another utterance, the process 450 may begin again.

Figure 10:
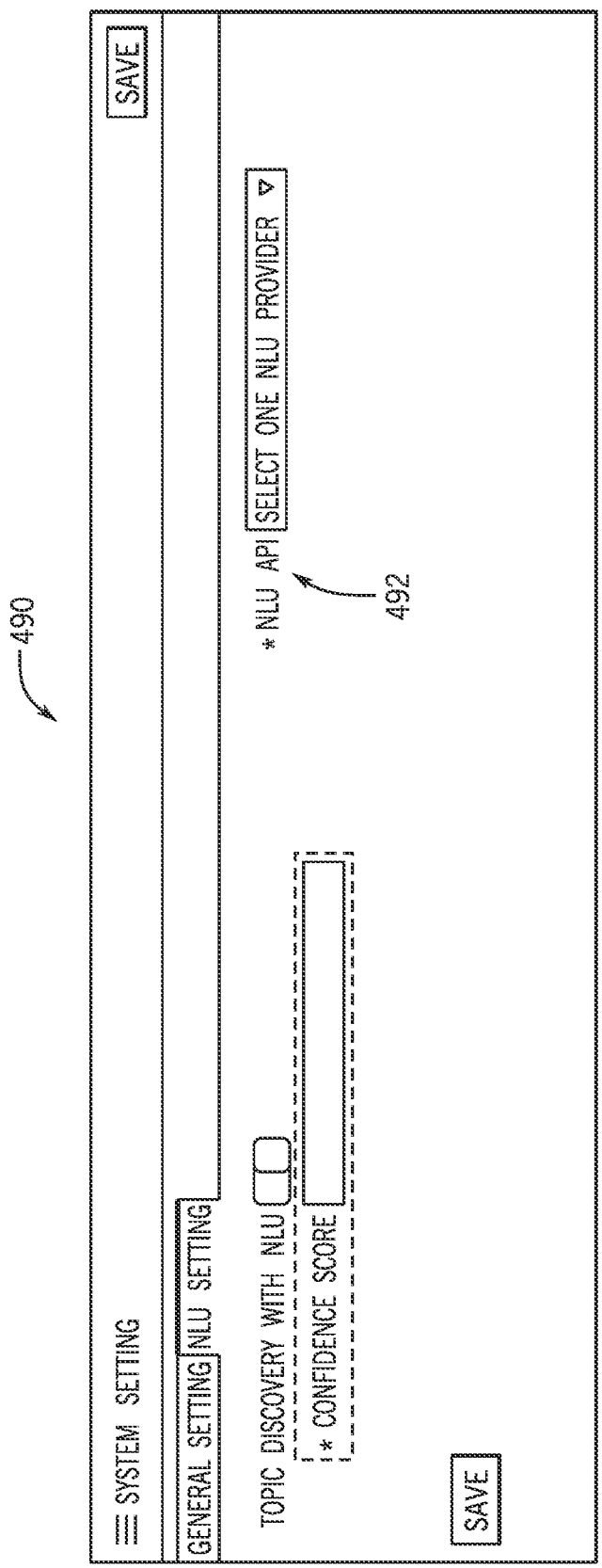
FIG. 10 is an embodiment of a user interface screen by which a customer may select the third party NLU service to be integrated with the virtual agent of FIG. 4, in accordance with aspects of the present disclosure.

FIG. 10 is a simulated screenshot of an embodiment of a graphical user interface (GUI) 490 by which a customer may select a third party NLU service 250 to integrate with the virtual agent 225 and form the integrated NLU service system 251 discussed above. It may be appreciated that the GUI 490, as well as other GUIs discussed below, may be hosted by the client instance 102 and accessed via a web browser application of the client device 20D. Additionally, it may be noted that the data received and presented by the GUI 490 may be stored in one or more suitable database tables of the database server 104.

Within the GUI 490 illustrated in FIG. 10, the customer may select a "NLU API" field 492, which opens a drop-down menu from which the customer may select a third party NLU service 250 from a predefined list of different NLU providers (e.g., PARLO, IBM WATSON, MICROSOFT LUIS, GOOGLE BERT, AMAZON ALEXA). Upon selection, the API associated with the selected third party NLU service 250 may be used to facilitate communication between the virtual agent 225 and the third party NLU service 250. That is, the third party NLU service 250 indicated by the "NLU API" field 492 will be provided received user utterances, along with one or more NLU models 224, in order to generate the scored set of intents and entities, as discussed above. If the desired third party NLU service 250 is shown in the drop down menu, a transformation script 270 may be provided for integrating the virtual agent 225 and the third party NLU service 250. If the desired third party NLU service 250 is not listed in the drop-down menu, the customer may select "other" and then provide his or her own transformation script 270 for efficiently integrating the virtual agent 225 and the third party NLU service 250. Though not shown in FIG. 10, in some embodiments, the GUI 490 may allow for inputs specifying the degree of integration between the virtual agent 225 and the third party NLU service 250.

The disclosed subject matter includes techniques for integrating a third party NLU service in to a virtual agent that utilizes an in-house NLU service. The third party NLU service may communicate with the virtual agent via an API. A transformation script may be used to configure the third party NLU service to work with the virtual agent, such as by establishing a transformation boundary that reworks or smooths communications between the third party NLU service and the virtual agent. As such, the virtual agent may receive an utterance from a user via a chat window, and then condition the utterance for analysis by the third party NLU service via the transformation boundary. The virtual agent provides the utterance to the third party NLU service. In some embodiments, a type of reply that the third party NLU service returns to the virtual agent depends on the degree on integration between the third party NLU service and the virtual agent. For example, in some embodiments, the third party NLU service may return intents, entities, and confidence scores to the virtual agent. In other embodiments, the third party NLU service may go as far as generating a response and/or taking actions within the cloud-based platform via the API. However, in either case, the intents, entities, and confidence scores, or the response, may be adjusted for utilization by the virtual agent via the transformation boundary. The virtual agent then provides a response to the user via the chat window, thereby cohesively leveraging processing power or features of the third party NLU service with the virtual agent within an integrated NLU service system to deliver improved end-user satisfaction.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An integrated natural language understanding (NLU) system, comprising:
a processor; and
a memory, the memory storing instructions that, when executed by the processor, cause the processor to operate a virtual agent to perform operations comprising:
conditioning, via a transformation boundary, an utterance from a chat session to form a conditioned utterance;
providing, via an application programming interface (API), the conditioned utterance to a third party natural language understanding (NLU) service;
receiving, via the API, a set of one or more intents, one or more entities, or one or more confidence scores, or any combination thereof, generated by the third party NLU service based on the conditioned utterance; and
outputting a response to the utterance based on the set.

2. The NLU system of claim 1, wherein the operations comprise executing a transformation script that defines one or more conditioning processes for conditioning the utterance from the chat session.

3. The NLU system of claim 1, wherein the operations comprise executing a transformation script that defines one or more conditioning processes for conditioning the set of one or more intents, one or more entities, or one or more confidence scores, or any combination thereof.

4. The NLU system of claim 1, wherein the operations comprise generating a graphical user interface (GUI) configured to receive a selection of the third party NLU service from a plurality of third party NLU services.

5. The NLU system of claim 1, wherein the virtual agent is native to a cloud-based platform that hosts the chat session and does not host the third party NLU service.

6. The NLU system of claim 1, wherein conditioning the utterance comprises parsing the utterance into segments consumable by the third party NLU service.

7. The NLU system of claim 1, wherein conditioning the utterance comprises modifying the utterance into a format compatible with the third party NLU service.

8. The NLU system of claim 1, wherein conditioning the utterance comprises abstracting or cleansing the utterance.

9. A method of operating a virtual agent integrated with a third party natural language understanding (NLU) service, comprising:
conditioning, via a transformation boundary, an utterance from a chat session to form a conditioned utterance;
providing, via an application programming interface (API), the conditioned utterance and an indication of a degree of integration to the third party NLU service;
receiving, via the API and based on the degree of integration, a set of one or more intents, one or more entities, and one or more confidence scores generated by the third party NLU service based on the conditioned utterance; and
outputting a first response to the utterance based on the set; or
receiving, via the API and based on the degree of integration, a second response to the utterance based on the conditioned utterance; and
outputting the second response to the utterance.

10. The method of claim 9, comprising:
receiving, via the API and based on the degree of integration, the set of one or more intents, one or more entities, and one or more confidence scores generated by the third party NLU service based on the conditioned utterance; and
outputting the first response to the utterance based on the set.

11. The method of claim 10, comprising conditioning the set of one or more intents, one or more entities, and one or more confidence scores before outputting the first response.

12. The method of claim 9, comprising:
receiving, via the API and based on the degree of integration, the second response to the utterance based on the conditioned utterance; and
outputting the second response to the utterance.

13. The method of claim 9, comprising executing a transformation script that defines one or more conditioning processes for conditioning the utterance from the chat session.

14. The method of claim 9, wherein conditioning the utterance from the chat session comprises implementing a universal conditioning process followed by a third-party specific conditioning process on the utterance.

15. A non-transitory, computer-readable medium storing instructions executable by at least one processor of a cloud-based platform, the instructions comprising instructions to operate a virtual agent to perform operations comprising:
- executing, via a transformation boundary, a transformation script that defines one or more conditioning processes for conditioning an utterance from a chat session to form a conditioned utterance;
- conditioning, via the transformation boundary, the utterance from the chat session to form the conditioned utterance based on the one or more conditioning processes;
- providing, via an application programming interface (API), the conditioned utterance to a third party natural language understanding (NLU) service;
- receiving, via the API, a set of one or more intents, one or more entities, or one or more confidence scores, or any combination thereof, generated by the third party NLU service based on the conditioned utterance; and
- outputting a response to the utterance based on the set.

16. The non-transitory, computer-readable medium of claim 15, wherein the set comprises at least two of: the one or more intents, the one or more entities, and the one or more confidence scores.

17. The non-transitory, computer-readable medium of claim 15, wherein the set comprises the one or more intents, and wherein the operations comprise identifying an intent of the one or more intents that is associated with at least a threshold confidence score.

18. The non-transitory, computer-readable medium of claim 17, wherein the operations comprise:
- identifying a virtual agent flow associated with the identified intent; and
- utilizing the virtual agent flow to generate the response to the utterance.

19. The non-transitory, computer-readable medium of claim 15, wherein the transformation script defines one or more additional conditioning processes for conditioning the set of one or more intents, one or more entities, or one or more confidence scores, or any combination thereof.

20. The non-transitory, computer-readable medium of claim 15, wherein the virtual agent is native to the cloud-based platform that hosts the chat session and does not host the third party NLU service.

* * * * *